United States Patent

[11] 3,617,368

[72] Inventors Dale S. Gibbs;
 Ritchie A. Wessling, both of Midland, Mich.
[21] Appl. No. 774,480
[22] Filed Nov. 8, 1968
[45] Patented Nov. 2, 1971
[73] Assignee The Dow Chemical Company
 Midland, Mich.

[54] PROCESS FOR PREPARING INHERENTLY COLLOIDALLY STABLE INTERPOLYMERS IN AQUEOUS DISPERSION AND PRODUCTS COATED THEREWITH
 2 Claims, No Drawings

[52] U.S. Cl. .................................................... 117/161 UT,
 117/132 C, 117/138.8 E, 117/143 A, 117/148,
 117/155 UA, 117/161 UC, 117/161 UH, 117/161
 UN, 260/29.6 TA, 260/29.6 Z
[51] Int. Cl. ............................................................ B32h27/06,
 B32b 27/30
[50] Field of Search ........................................... 117/138.8,
 155, 161, 132; 260/29.6

[56] References Cited
 UNITED STATES PATENTS
2,300,920 11/1942 Heuer .............................. 260/29.6
2,748,027 5/1956 Meier .............................. 117/161 X
2,805,963 9/1957 Gaylord .......................... 117/161 X
2,910,385 10/1959 Berry et al. ..................... 117/161 X
3,177,172 4/1965 Adams ............................ 260/29.6
3,320,199 5/1967 Brezinski et al. ............... 260/29.6

Primary Examiner—William D. Martin
Assistant Examiner—Mathew R. P. Perrone, Jr.
Attorneys—Griswold and Burdick, Ronald G. Brookens and Albin R. Lindstrom ABSTRACT: This invention is directed to improved coated products comprising essentially a substrate having a dried, continuous adherent coating of certain colloidally stable polymer latexes thereon which latexes are essentially devoid of conventional wetting agents or surfactants. More particularly, the invention concerns the use as coating materials of polymer latexes containing as the essential ingredient therein, an interpolymer prepared by the essentially continuous addition polymerization in aqueous dispersion of major proportions of an essentially hydrophobic monomer, specified minor proportions of a second relatively hydrophilic ethylenically unsaturated "go-between" comonomer and specified minor proportions of certain copolymerizable ionic water-soluble materials. These latexes are particularly useful for preparing coated products comprising a substrate having a continuous, adherent, dried coating of the latex thereon, which coating has excellent barrier, flexiblity, heat-seal and binding capacity properties.

PROCESS FOR PREPARING INHERENTLY COLLOIDALLY STABLE INTERPOLYMERS IN AQUEOUS DISPERSION AND PRODUCTS COATED THEREWITH

In the well-known art of emulsion polymerization a monomeric, usually water-insoluble, liquid composition comprising a polymerizable, ethylenically unsaturated compound such as styrene, butadiene, methyl methacrylate, ethyl acrylate, vinyl acetate, vinyl chloride, vinylidene chloride or mixtures thereof, is colloidally emulsified in an aqueous medium that usually contains a wetting agent or surfactant, such as a water-soluble alkali soap, and a polymerization catalyst such as potassium persulfate. The resulting colloidal emulsion is then subjected to conditions conducive to polymerization of the monomeric constituents to produce an aqueous colloidal dispersion of the corresponding polymeric product, the aqueous colloidal dispersion being commonly called a latex.

The stability of the resulting polymer latex (aqueous colloidal dispersion) against coagulation or precipitation of its polymer ingredient depends primarily upon the kind and amount of surfactants and the like that are contained in the aqueous suspending medium. In many instances, the dispersions are quite unstable, particularly when subjected to mechanical agitation, to heat or cold, or upon addition to the dispersion of polyvalent ions such as ionized calcium salts, such influences causing coagulation of the polymer particles. In some instances, the stability of the latex can be improved by adding further amounts of surfactants or other stabilizers to the colloidal dispersions after completion of the polymerization step. However, latexes stabilized with external surfactants are stable only to a limited degree and are more or less vulnerable to external destabilization.

Moreover, in many instances and for many purposes the conventionally employed water-soluble surfactants and stabilizers (added to increase the latex stability) are ultimately objectionable. For example, in coatings derived from aqueous latexes by evaporation of water from a layer of such latex, the nonvolatile surfactants remain together with the polymer deposit. In many instances the water-soluble ingredients of the coating seriously and deleteriously affect the quality of the coating, as for example, the adhesion of the coating to the substrate as well as the barrier and heat seal properties of the coating.

It is an object of this invention to provide improved polymer latexes which are colloidally stable without the utilization of the conventional water-soluble wetting agents or surfactants and which form continuous adherent dried coatings of desired barrier, heat-seal and binding capacity properties.

A further object is to provide coated products comprising a substrate material having a continuous, adherent, dried coating of the prescribed polymer latex thereon.

Other objects and advantages of the invention will be evident in the following description.

The objects of this invention have been attained by the use of a polymer latex consisting essentially of water and an interpolymer prepared by the essentially continuous addition polymerization in aqueous dispersion of 1. between 50 and about 95 percent based on the total weight of monomers used of essentially hydrophobic ethylenically unsaturated monomeric material;
2. from about 0.5 to 30 weight percent based on the weight of (1) and (2) of a second relatively more hydrophilic ethylenically unsaturated monomeric material wherein such monomeric material has a solubility in both the water phase and oil phase of the polymer latex of at least 1 weight percent at the temperature of polymerization; and
3. from 0.1 to about 5 weight percent based on the total weight of other monomers of an ionic significantly water-soluble material which is copolymerizable with (2) and is selected from the group of sulfonic acids and their salts having the formula:

wherein the radical R is selected from the group consisting of vinyl and α-substituted vinyl; the symbol Z represents a difunctional linking group which will activate the double bond in the vinyl group; –Q– is a divalent hydrocarbon having its valence bonds on different carbon atoms; and the symbol M+ represents a cation.

The essentially hydrophobic monomers of (1) above include an ethylenically unsaturated monomeric material, which copolymerizes readily in aqueous dispersion with the monomeric materials of (2). A particularly preferred monomeric material for use in preparing the inherently colloidally stable polymer latexes contemplated by this invention is vinylidene chloride or monomeric mixtures containing predominant amounts of vinylidene chloride. Utilization of these monomers in the prescribed amount provides for the obtainment of a continuous and continuously adherent dried coating for a wide variety of substrates, which coatings are characterized by excellent barrier, heat seal and binding capacity properties. Exemplary of other monomers which may be advantageously used, depending on the properties desired in the polymer latex and coating obtained therefrom, include styrene; the alkyl styrenes, particularly the tertiary butyl styrenes; alkyl acrylates and methacrylates, where the alkyl group contains at least about eight carbon atoms; and vinyl esters or fatty acids containing at least about eight carbon atoms.

The relatively hydrophilic monomers of (2) above include those materials which are readily copolymerizable with (1) in aqueous dispersion, i.e., which copolymerize within a period of less than about 40 hours at a temperature ranging from the freezing point of the monomeric serum up to about 100° C., and which have a solubility in both the water and the oil phase of the polymer latex of at least 1 weight percent at the temperature of polymerization. Exemplary of preferred materials, particularly when used in conjunction with monomeric vinylidene chloride, are: methacrylic acid and methyl methacrylate. Other monomers which may be advantageously employed include the hydroxy ethyl and propyl acrylates, hydroxyethylmethacrylate, acrylic acid, acrylonitrile, methacrylonitrile, acrylamide and the lower alkyl and dialkylacrylamides, acrolein, methylvinyl ketone and vinyl acetate. These monomers are employed in amounts of from 0.5 to 30 weight percent, based on the total weight of the nonionic monomers used, to provide for the necessary reactivity with the copolymerizable ionic material of (3) and also to provide for the required solubility of the interpolymer in water. Thus, such materials may be referred to as "go-between" monomers. It is to be understood that the optimum amount of such relatively hydrophilic monomers may vary somewhat within the prescribed range depending upon the amount of hydrophobic monomer used in preparing the polymer latex as well as upon the amount and type of the copolymerizable ionic monomer used.

The copolymerizable ionic monomer of the polymer latexes of the present invention are those monomeric materials which contain in their structure both an ionizable group and a reactive double bond, are significantly soluble in water, are copolymerizable with the hydrophilic monomer constituent (2) and where the substituent on the double bond is chemically stable under the conditions normally encountered in emulsion polymerization. Particularly useful are the sulfonic acids and their salts which may be described by the formula:

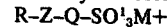

wherein the radical R is selected from the group consisting of vinyl and α-substituted vinyl; where the symbol Z represents a difunctional linking group which will activate the double bond present in the vinyl group, e.g. groups of the structure:

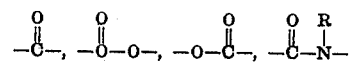

, and the like; where –Q– is a divalent hydrocarbon having its valence bonds on different carbon atoms, e.g. the alkylene and arylene divalent hydrocarbon radicals having from one to about eight carbon atoms; and M+ is a cation.

The solubility of the defined copolymerizable ionic materials as described herein is strongly influenced by the cation M+. Exemplary of preferred cations are the free acids, alkali metal salts, ammonium and amine salts and sulfonium and quaternary ammonium salts and sulfonium and quaternary ammonium salts.

It is further to be noted that with one of the ions above, and the usual choices for R and Z, the solubility of the monomer depends on Q. As indicated, this group can be either aliphatic or aromatic and its size will determine the hydrophilic/hydrophobic balance in the molecule, i.e., if Q is relatively small the monomer is water soluble but as Q becomes progressively larger the surface activity of such monomer increases until it becomes a soap and ultimately a water insoluble wax. It is to be understood, however, that the limiting size of Q depends on R, Z and M+. As exemplary of the above it has been found that sodium sulfoalkyl methacrylates of the formula:

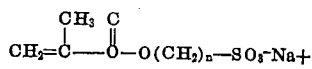

wherein $n$ is 2, are highly acceptable copolymerizable ionic materials for use in the present invention.

Further, the selection of R and Z is governed by the reactivity needed and the selection of Q is usually determined by the reaction used to attach the sulfonic acid to the base monomer (or vice versa).

It has been found that sodium sulfoethyl methacrylate is particularly effective for use with monomeric vinylidene chloride and the relatively hydrophilic monomers methyl methacrylate or methacrylic acid when used in the amounts and in the manner called for by the present invention.

As previously indicated, the polymer latexes used in the present invention must be prepared from the prescribed combination of monomeric materials and in addition are preferably prepared in aqueous dispersion by an essentially continuous, carefully controlled addition of the requisite polymerization constituents (including polymerization initiator systems if desired) to the aqueous medium.

In the process of the present invention it is often preferred to first add a small amount of the monomeric materials, as defined herein, to the aqueous medium having the desired pH value, followed by the subsequent addition of the necessary polymerization initiator, to form a polymeric seed latex in order to aid in the control of particle size. When forming such polymeric seed latexes by the procedure as described herein, very small amounts of conventional wetting agents such as alkali soaps or the like, may be incorporated in the aqueous medium to further aid in the attainment of particles of desired size. The addition of such wetting agents, however, is not critical for the production of the highly stable aqueous colloidal dispersions of polymeric particles.

Following the formation of the polymeric seed latex, the remaining polymerization constituents are simultaneously and continuously added under carefully controlled conditions to the aqueous medium.

The compositions, as described herein, are subjected to conditions conducive to polymerization of the polymerizable constituents. In most instances, the temperature of the aqueous dispersion is adjusted, for example, to a temperature between about the freezing point of the serum and 100° C. to activate the polymerization. Other means, such as exposure of the composition to active radiation can be employed to promote polymerization of the polymerizable constituent.

The highly stable polymer latexes of the present invention are characterized by the virtual absence of undesirable coagulum which often results when polymeric latexes are stabilized by conventional water-soluble wetting agents or surfactants. Thus, such latexes combine the highly beneficial properties of optimum colloidal stability, reduced viscosities at relatively high polymer solids content, low foaming tendencies and excellent product uniformity and reproducibility.

Furthermore, such latexes are particularly useful for preparing coated products comprising a wide variety of substrates having a continuous, adherent, dried coating of such latex thereon which coating has excellent barrier, flexibility, heat seal and binding capacity properties.

Exemplary of the substrates which may be advantageously coated with the polymer latexes of this invention are sheets or films of: the nonaromatic hydrocarbon olefin polymers such as the polymers and interpolymers of ethylene, propylene, and butylene and the like and their halogenated derivatives; the aromatic hydrocarbon polymers such as the polymers and interpolymers of styrene and the like; the polyesters such as polyethylene terephthalate and the like; various polyamides such as polyhexamethylene adipamide among others; polyimides; the halogenated ethylene polymers such as the vinyl and vinylidene chloride homopolymers and interpolymers; polyacrylonitrile; regenerated cellulose; and the various cellulose esters such as cellulose acetate, cellulose nitrate and cellulose acetate butyrate; polyvinyl acetals; vinyl combinations such as polyvinyl chloride/polyvinyl acetate copolymers; fibrous cellulosic materials such as tissue paper, book papers, crepe paper, wrapping paper, cardboard, chipboard, wallboard and the like; metals such as aluminum and tin, among others; wood products such as plywood; textiles such as cotton textiles and fabrics; other vegetable fiber products; and other substrata which are relatively insoluble in the coating dispersions of the present invention. It is to be understood that the polymer latexes described herein cal also be used to cast unsupported films or sheets if desired.

The following examples illustrate the polymer latexes and preparation of coated products therefrom according to this invention, but are not to be construed as limiting its scope. In the examples, parts and percentages are by weight unless otherwise indicated.

EXAMPLE 1

Into a polymerization vessel was charged a mixture of 420 grams of deionized water (adjusted to pH value of 3.5 to 4.0 with hydrochloric acid) and 3.5 grams of sodium lauryl sulfate. To this aqueous mixture was subsequently added an initial monomer charge comprising 44 grams of vinylidene chloride, 3.5 grams ethyl acrylate and 0.5 gram cumene hydroperoxide.

The reaction mixture was then stirred under nitrogen for a period of to minutes at a temperature of 25° C., and a solution comprising 1 gram of sodium sulfoxylate formaldehyde dissolved in 499 grams of deionized water was thereafter added to the reaction mixture at a rate of 7.7 grams of solution per hour until polymerization of the initial charge of monomers was completed. Following completion of polymerization of the initial charge of monomeric materials, a second monomeric mixture comprising 836 grams of vinylidene chloride, 66.5 grams ethyl acrylate, 40 grams of methacrylic acid, and 0.95 grams of cumene hydroperoxide were added to the polymerization vessel with stirring at a rate of about 62.9 grams of the mixture per hour for a period of 15 hours. Over the same period of time, a solution comprising 10 grams of sodium sulfoethyl methacrylate dissolved in 390 grams of deionized water was separately added to the polymerization vessel at a rate of 26.6 grams of solution per hour. Following the addition of the polymerizable material, the herein described aqueous solution of sodium sulfoxylate formaldehyde was added to the polymerization vessel at the preestablished rate for a period of 2 hours, to allow completion of polymerization of the monomeric constituents. The resulting polymerization product was a highly stable, low-foaming, aqueous colloidal polymer dispersion containing approximately 48 to 50 percent polymer solids having less than about 0.1 weight percent of coagulum present therein.

This polymer latex showed no evidence of coagulation when heated at 60° C. for a 2-week period and, when applied as a dried thin layer on a supporting paper substrate, formed a continuous, clear, uniformly adherent and nonblocking film having a moisture transmission rate of about 0.4 grams/100 inch²/24 hours/0.4 mil thickness.

For purposes of comparison, a second polymer latex was prepared as described herein using identical materials but wherein the methacrylic acid constituent was excluded. This latex was characterized by a noticeable settling of latex particles when heated at 60° C. for a 2-week period, and when applied as a film to a paper substrate, as hereinbefore described, evidenced significantly greater tendencies for undesirable blocking.

By the way of further comparison, a third polymer latex was prepared as described herein using identical materials but where the sodium sulfoethyl methacrylate constituent was excluded. This latex was characterized by having greater than about 1 weight percent of coagulum present therein with a significant increase in coagulation when heated at 60° C. for a 2-week period.

EXAMPLE 2

In each of several additional experiments individual polymer latexes were separately prepared essentially by the process as described in example 1 by interpolymerization of the monomeric ingredients as set forth in table I.

Each polymer latex was then individually applied as a continuous coating on separate polypropylene film substrates having a thickness of about 1.5 mil and the latex dried to form a thin film having a thickness of about 0.1 mil. Table II illustrates the latex used and the following physical properties of the coating, wherein each value represents the average of four individual determinations.

The data of table II illustrate the necessity for using the required combination of hydrophobic monomer, hydrophilic monomer and ionic monomer to achieve required latex stability. Such data further illustrate that the utilization of the ionic monomer as the source of colloidal stability in lieu of a conventional surfactant provides significantly improved adhesion and seal strength (compare series III and IV with series I and II).

EXAMPLE 3

In each of a series of additional experiments the polymer latexes identified in example 2 as run Nos. 8 and 4 respectively, were individually applied to several different substrates. Run No. 8, which represents a polymer latex contemplated for use by the present invention, prepared from 70 weight percent vinylidene chloride, 10 weight percent methyl methacrylate, 20 weight percent butyl acrylate and 1.8 weight percent sodium sulfoethyl methacrylate. Run No. 4, which illustrates a polymer latex falling outside of those contemplated for use by the present invention, is an interpolymer of 70 weight percent vinylidene chloride, 10 weight percent methyl methacrylate, 20 weight percent butyl acrylate in combination with 3.0 weight percent of sodium dodecylbenzene sulfonate, a conventional water-soluble surfactant. Note that Run No. 4 differs from Run No. 8 only in the substitution of the conventional surfactant for the ionic comonomeric emulsifier required by the present invention.

Each polymer latex was prepared as described in example 2 and individually applied to each of a series of substrates to provide a uniform coating thereon having a thickness of about 0.1 mil. The coatings were then dried and the coated surfaces of the substrate heat-sealed together at a temperature of about 170° C. for 0.5 to 1.0 seconds using about 20 p.s.i. The heat seal strength and adhesive strength was then obtained as the average value of 4 individual determinations. The following table III illustrates the polymer latexes used and the results obtained.

TABLE I

| Polymer latex run Nos. | Hydrophobic monomer (pts. by wt.) vinylidene chloride | Hydrophilic monomer (pts. by wt.) VCN¹ | Hydrophilic monomer (pts. by wt.) MMA¹ | Ionic monomer (pts. by wt.) SEM¹ | Other monomer (pts. by wt.) BA¹ |
|---|---|---|---|---|---|
| Series I (for comparison). No hydrophilic monomer: | | | | | |
| 1 | 90 | None | | 1.6 | 10 |
| 2 | 70 | None | | 1.8 | 30 |
| Series II (for comparison). No ionic monomer²: | | | | | |
| 3 | 90 | 0 | 5 | 0 | 5 |
| 4 | 70 | 0 | 10 | 0 | 20 |
| Series III (the invention). VCN as the hydrophilic monomer: | | | | | |
| 5 | 90 | 5 | 0 | 1.6 | 5 |
| 6 | 92 | 8 | 0 | 1.6 | 0 |
| Series IV (the invention). MMA as the hydrophilic monomer: | | | | | |
| 7 | 90 | 0 | 5 | 1.6 | 5 |
| 8 | 70 | 0 | 10 | 1.8 | 20 |

¹ VCN—acrylonitrile, MMA—methyl methacrylate, SEM—sulfoethyl methacrylate, BA—butyl acrylate.
² Polymerization charge contained 3.0 parts by weight of sodium dodecylbenzene sulfonate.

TABLE II

| Polymer latex | Percent coagulation | Heat seal temp., °C. | Seal strength, gms./in. | Adhesion, gms./in. |
|---|---|---|---|---|
| Series I (for comparison): No hydrophilic monomer: | After shearing the latex for 20 min. at 45° C. | | | (¹). |
| 1 | Coagulated | | | |
| 2 | do | 160 | 510 | No separation. |
| Series II (for comparison): No ionic monomer: | | 160 | 458 | Do. |
| 3 | do | 160 | 166 | 95. |
| 4 | do | 160 | 137 | 50. |
| Series III (the invention): VCN as the hydrophilic monomer: | | | | |
| 5 | 0.28 | 160 | 364 | 155. |
| 6 | 0.42 | 160 | 268 | 168. |
| Series IV (the invention): MMA as the hydrophilic monomer: | | | | |
| 7 | 1.3 | 160 | 448 | No separation. |
| 8 | 0.26 | 160 | 314 | Do. |

¹ Film failed before the coating separated.

TABLE III

| Substrate description | Polymer latex | | | |
|---|---|---|---|---|
| | Run No. 4 (for comparison) | | Run No. 8 (the invention) | |
| | Heat seal strength | Adhesion | Heat seal strenfth, gms./in. | Adhesion |
| Polyethylene terephthalate (1 mil-corona discharge treated) | 23 | 13 | 92 | 53 |
| Polyvinyl chloride (1-mil-corona discharge treated) | 213 | 74 | 607 | 131 |
| Nylon (1 mil-corona discharge treated) | 105 | 50 | 180 | 70 |
| Cellophane (pt.) (1 mil-untreated) | 163 | 61 | 175 | 86 |
| Cellophane (140 MSBO) (1 mil-untreated) | 406 | 249 | 427 | 322 |
| Aluminum foil (2 mil-untreated) | 91 | 47 | 678 | 566 |

What is claimed is:

1. A coated product comprising an essentially water-insoluble sheet or film material having a dried, continuous, self-adherent polymeric coating on at least one major surface thereof, said coating being at least about 0.1 mil in thickness and consisting of a solid addition polymer resulting from the dried residue of a latex prepared by the substantially continuous addition polymerization in aqueous dispersion of a mixture of:

1. between 50 and about 95 weight percent based on the total weight of monomers used of an essentially hydrophobic enthylenically unsaturated monomeric material;
2. from about 0.5 to 30 weight percent based on the weight of (1) and (2) of a second relatively more hydrophilic ethylenically unsaturated comonomer which has a solubility in both the water and the oil phase of said aqueous dispersion of at least 1 weight percent at the temperature of polymerization;
3. from 0.1 to 5 weight percent based on the total weight of monomers used of a significantly water-soluble ionic material which is copolymerizable with (2) which material is selected from the group of sulfonic acids and their salts having the formula $$R-Z-Q-SO'_3-M+$$

wherein the radical R is selected from the group consisting of vinyl and $\alpha$-substituted vinyl; the symbol Z represents a difunctional linking group which will activate the double bond present in said vinyl group; -Q- is a divalent hydrocarbon having its valence bonds on different carbon atoms; the symbol M+ represents a cation selected from the group consisting of free acids, alkali metal salts, and ammonium, amine, sulfonium and quaternary ammonium salts.

2. The coated product of claim 1 wherein (1) is vinylidene chloride, (2) is selected from the group consisting of methacrylic acid, methyl methacrylate and acrylonitrile and (3) is sodium sulfoethyl methacrylate.

* * * * *

PO-1050
(5/69)

UNITED STATES PATENT OFFICE
CERTIFICATE OF CORRECTION

Patent No. 3,617,368     Dated 2 November 1971

Inventor(s) Dale S. Gibbs and Ritchie A. Wessling

It is certified that error appears in the above-identified patent and that said Letters Patent are hereby corrected as shown below:

In column 1, line 75, change the formula to:
-- $R - Z - Q - SO_3^- M^+$ --.

In column 2, line 8, delete "an" and insert -- any --; in line 65 change the formula to: -- $R - Z - Q - SO_3^- M^+$ --;

at line 71 change the structure to:

$$-\overset{\overset{O}{\|}}{C}-,\ -\overset{\overset{O}{\|}}{C}-O-,\ -O-\overset{\overset{O}{\|}}{C}-,\ -\overset{\overset{O}{\|}}{C}-\overset{\overset{R}{|}}{N}-,$$

In column 4, line 29, delete "cal" and insert -- can --; in line 46 delete "to" and insert -- 10 --.

In column 8, line 11, insert -- about -- between "to" and "5"; in line 16 change the formula to:

-- $R - Z - Q - SO_3^- - M^+$

Signed and sealed this 6th day of June 1972.

(SEAL)
Attest:

EDWARD M. FLETCHER, JR.
Attesting Officer

ROBERT GOTTSCHALK
Commissioner of Patents